US012786310B2

(12) United States Patent
Ma et al.

(10) Patent No.: US 12,786,310 B2
(45) Date of Patent: Nov. 3, 2026

(54) DATA TRANSMISSION METHOD, CENTRAL CONTROL TERMINAL, MOBILE TERMINAL AND DATA TRANSMISSION SYSTEM

(71) Applicant: BOE TECHNOLOGY GROUP CO., LTD., Beijing (CN)

(72) Inventors: Cheng Ma, Beijing (CN); Youxiang Xia, Beijing (CN); Yan Shen, Beijing (CN); Tieli Chen, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 295 days.

(21) Appl. No.: 18/687,358

(22) PCT Filed: Sep. 21, 2022

(86) PCT No.: PCT/CN2022/120097

§ 371 (c)(1),
(2) Date: Feb. 28, 2024

(87) PCT Pub. No.: WO2023/093242

PCT Pub. Date: Jun. 1, 2023

(65) Prior Publication Data

US 2024/0364808 A1 Oct. 31, 2024

(30) Foreign Application Priority Data

Nov. 29, 2021 (CN) ........................ 202111430874.7

(51) Int. Cl.
*H04M 1/72463* (2021.01)
*G06F 21/32* (2013.01)
(Continued)

(52) U.S. Cl.
CPC ...... *H04M 1/724631* (2022.02); *G06F 21/32* (2013.01); *H04L 67/06* (2013.01); *H04M 1/72412* (2021.01); *H04M 1/72469* (2021.01)

(58) Field of Classification Search
None
See application file for complete search history.

(56) References Cited

U.S. PATENT DOCUMENTS

2019/0182534 A1* 6/2019 Matsuoka .............. H04N 21/44
2019/0342753 A1* 11/2019 Zhu ......................... H04W 4/80

FOREIGN PATENT DOCUMENTS

CN 104038256 A 9/2014
CN 104105053 A 10/2014
(Continued)

OTHER PUBLICATIONS

China Patent Office, CN202111430874.7 First Office Action issued on Feb. 5, 2023.

*Primary Examiner* — Suhail Khan
(74) *Attorney, Agent, or Firm* — HOUTTEMAN LAW LLC

(57) ABSTRACT

The embodiment of the present disclosure provides a data transmission method, a central control terminal, a mobile terminal and a data transmission system and relates to the field of data transmission for realizing data transmission in a multi-person conference in a network-free environment and improving the convenience of data transmission. The data transmission method is applied to a central control terminal and includes: reading an identification information of a mobile terminal in response to a near field communication signal from the mobile terminal; and determining whether the identification information belongs to a target identification set; performing Bluetooth connection and data transmission with the mobile terminal when the identification information belongs to the target identification set.

17 Claims, 8 Drawing Sheets

(51) Int. Cl.
*H04L 67/06* (2022.01)
*H04M 1/72412* (2021.01)
*H04M 1/72469* (2021.01)

(56) References Cited

FOREIGN PATENT DOCUMENTS

| | | | |
|---|---|---|---|
| CN | 106341382 | A | 1/2017 |
| CN | 106470386 | A | 3/2017 |
| CN | 109831769 | A | 5/2019 |
| CN | 111488095 | A | 8/2020 |
| CN | 114040146 | A | 2/2022 |
| WO | WO 2014059753 | A1 | 4/2014 |
| WO | WO 2016145820 | A1 | 9/2016 |

* cited by examiner

DATA TRANSMISSION METHOD, CENTRAL CONTROL TERMINAL, MOBILE TERMINAL AND DATA TRANSMISSION SYSTEM

TECHNICAL FIELD

The present disclosure relates to the field of data transmission technology, in particular to a data transmission method, a central control terminal, a mobile terminal and a data transmission system.

BACKGROUND

The conference is a communication mode for enterprise management, and with the rapid development of information technology, the limitation of the traditional paper conference mode mainly based on listening and speaking is increasingly obvious, and the application of an electronic device to a conference place gradually becomes a trend.

However, the data transmission of the electronic device in a conference scene mostly depends on a wireless network, and thus, has an extremely high requirement on the stability of the network, the sharing of conference materials is greatly influenced by the unstable network, and the wireless network cannot guarantee the security of a network environment, which easily causes the leakage of the conference materials. On the other hand, in a network-free environment, the data transmission by using a USB flash disk is complex and is not suitable for a multi-person case.

SUMMARY

The embodiment of the present disclosure provides a data transmission method, a central control terminal, a mobile terminal and a data transmission system, for realizing data transmission in a multi-person conference in a network-free environment and improving the convenience of data transmission.

In a first aspect, the present disclosure provides a data transmission method, which is applied to a central control terminal, wherein the data transmission method includes: reading an identification information of a mobile terminal in response to a near field communication signal from the mobile terminal; and determining whether the identification information belongs to a target identification set; performing Bluetooth connection and data transmission with the mobile terminal in response to the identification information belonging to the target identification set.

In some embodiments, in response to the identification information belonging to the target identification set, the data transmission method further includes: acquiring an authority level corresponding to the identification information; and sending an interface control instruction to the mobile terminal according to the authority level, so that the mobile terminal displays a menu interface corresponding to the authority level, wherein the menu interface is configured with at least one transmission mode identifier; wherein the performing the data transmission with the mobile terminal includes: performing, in response to a mode selection instruction, the data transmission with the mobile terminal according to a data transmission mode corresponding to the mode selection instruction; wherein the mode selection instruction is an instruction generated by the mobile terminal in response to the transmission mode identifier selected by the user.

In some embodiments, performing, in response to a mode selection instruction, the data transmission with the mobile terminal according to a data transmission mode corresponding to the mode selection instruction, includes: performing a file transmission operation in response to a first mode selection instruction sent by the mobile terminal; wherein the file transmission operation includes: sending a first file corresponding to a first file selection instruction to the mobile terminal in response to the first file selection instruction; and/or receiving a second file sent by the mobile terminal.

In some embodiments, performing, in response to a mode selection instruction, the data transmission with the mobile terminal according to a data transmission mode corresponding to the mode selection instruction, includes: performing password verification with the mobile terminal in response to the first mode selection instruction sent by the mobile terminal; and performing a file transmission operation in response to the password being successfully verified; wherein the file transmission operation includes: sending a first file corresponding to a first file selection instruction to the mobile terminal in response to the first file selection instruction; and/or receiving a second file sent by the mobile terminal.

In some embodiments, performing, in response to a mode selection instruction, the data transmission with the mobile terminal according to a data transmission mode corresponding to the mode selection instruction, includes: acquiring an image sent by the mobile terminal in response to a second mode selection instruction sent by the mobile terminal and controlling a display screen to display the image.

In some embodiments, performing, in response to a mode selection instruction, the data transmission with the mobile terminal according to a data transmission mode corresponding to the mode selection instruction, includes: acquiring a category identifier of the mobile terminal in response to a third mode selection instruction sent by the mobile terminal; determining an identity label of the mobile terminal according to the authority level and the category identifier of the mobile terminal; selecting at least one target file from a pre-stored file set, wherein a plurality of third files are stored in the file set, each of the third files is labeled with a corresponding file label, and the target file is a third file with a labeled file label consistent with the identity label; and sending the at least one target file to the mobile terminal.

In some embodiments, performing, in response to a mode selection instruction, the data transmission with the mobile terminal according to a data transmission mode corresponding to the mode selection instruction, includes: performing password verification with the mobile terminal in response to a third mode selection instruction sent by the mobile terminal; acquiring a category identifier of the mobile terminal in response to the password verification being successful; determining an identity label of the mobile terminal according to the authority level and the category identifier of the mobile terminal; selecting at least one target file from a pre-stored file set, wherein a plurality of third files are stored in the file set, each of the third files is labeled with a corresponding file label, and the target file is a third file with a labeled file label consistent with the identity label; sending the at least one target file to the mobile terminal.

In some embodiments, performing, in response to a mode selection instruction, the data transmission with the mobile terminal according to a data transmission mode corresponding to the mode selection instruction, includes: recording current time and the identification information of the mobile terminal in response to a fourth mode selection instruction sent by the mobile terminal; and/or sending a prompt instruction to the mobile terminal, so that the mobile terminal displays prompt information in response to the prompt instruction, wherein the prompt information is used for prompting a user to input survey information to the mobile terminal; and receiving a survey result fed back by the mobile terminal according to the survey information.

In a second aspect, the embodiment of the present disclosure provides a data transmission method, which is applied to a mobile terminal, wherein the data transmission method includes: sending a near field communication signal to a central control terminal, so that the central control terminal reads identification information carried in the near field communication signal, and determines whether the identification information belongs to a target identification set; and performing Bluetooth connection and data transmission with the central control terminal in response to the identification information belonging to the target identification set.

In some embodiments, in response to the identification information belonging to the target identification set, the data transmission method further includes: receiving an interface control instruction sent by the central control terminal; wherein the interface control instruction is generated by the central control terminal according to an authority level corresponding to the identification information; and displaying a menu interface corresponding to the authority level in response to the interface control instruction, wherein the menu interface is configured with at least one transmission mode identifier; performing the data transmission with the central control terminal includes: generating a mode selection instruction in response to the transmission mode identifier selected by the user, sending the mode selection instruction to the central control terminal, and performing the data transmission with the central control terminal according to a data transmission mode corresponding to the mode selection instruction.

In some embodiments, generating the mode selection instruction in response to the transmission mode identifier selected by the user, sending the mode selection instruction to the central control terminal, and performing the data transmission with the central control terminal according to the data transmission mode corresponding to the mode selection instruction, includes: generating a first mode selection instruction in response to a first transmission mode identifier selected by the user; and sending the first mode selection instruction to the central control terminal, so that the central control terminal performs a file transmission operation in response to the first mode selection instruction; wherein the file transmission operation includes: receiving a first file sent by the central control terminal; and/or sending a second file corresponding to a second file selection instruction to the central control terminal in response to the second file selection instruction.

In some embodiments, generating the mode selection instruction in response to the transmission mode identifier selected by the user, sending the mode selection instruction to the central control terminal, and performing the data transmission with the central control terminal according to the data transmission mode corresponding to the mode selection instruction, includes: generating a first mode selection instruction in response to a first transmission mode identifier selected by the user; sending the first mode selection instruction to the central control terminal, and performing password verification with the central control terminal; and performing a file transmission operation in response to the password verification being successful; wherein the file transmission operation includes: receiving a first file sent by the central control terminal; and/or sending a second file corresponding to a second file selection instruction to the central control terminal in response to the second file selection instruction.

In some embodiments, generating the mode selection instruction in response to the transmission mode identifier selected by the user, sending the mode selection instruction to the central control terminal, and performing the data transmission with the central control terminal according to the data transmission mode corresponding to the mode selection instruction, includes: generating a second mode selection instruction in response to a second transmission mode identifier selected by the user; sending the second mode selection instruction to the central control terminal; and acquiring an image displayed currently on a display interface, and sending the image to the central control terminal so that the central control terminal controls a display screen to display the image.

In some embodiments, generating the mode selection instruction in response to the transmission mode identifier selected by the user, sending the mode selection instruction to the central control terminal, and performing the data transmission with the central control terminal according to the data transmission mode corresponding to the mode selection instruction, includes: generating a third mode selection instruction in response to a third transmission mode identifier selected by the user; sending the third mode selection instruction to the central control terminal so that the central control terminal acquires a category identifier of the mobile terminal in response to the third mode selection instruction, determines an identity label of the mobile terminal according to the authority level and the category identifier, and selects at least one target file from the pre-stored file set, wherein a plurality of third files are stored in the file set, each of the third files is labeled with a corresponding file label, and the target file is a third file with a labeled file label consistent with the identity label; and receiving the at least one target file sent by the central control terminal.

In some embodiments, generating the mode selection instruction in response to the transmission mode identifier selected by the user, sending the mode selection instruction to the central control terminal, and performing the data transmission with the central control terminal according to the data transmission mode corresponding to the mode selection instruction, includes: generating a third mode selection instruction in response to a third transmission mode identifier selected by the user; sending the third mode selection instruction to the central control terminal, and performing password verification with the central control terminal; wherein the central control terminal, based on the third mode selection instruction, acquires a category identifier, determines an identity label of the mobile terminal according to the authority level and the category identifier, and selects at least one target file from the pre-stored file set, wherein the plurality of third files are stored in the file set, each of the third files is labeled with a corresponding file label, and the target file is a third file with a labeled file label consistent with the identity label; and receiving the at least one target file sent by the central control terminal in response to the password verification being successful.

In some embodiments, generating the mode selection instruction in response to the transmission mode identifier selected by the user, sending the mode selection instruction to the central control terminal, and performing the data transmission with the central control terminal according to the data transmission mode corresponding to the mode selection instruction, includes: generating a fourth mode selection instruction in response to a fourth transmission mode identifier selected by the user; sending the fourth mode selection instruction to the central control terminal so that the central control terminal records current time and the identification information of the mobile terminal; and/or receiving a prompt instruction sent by the central control terminal, and displaying prompt information in response to the prompt instruction, wherein the prompt information is used for prompting the user to input survey information; and sending a survey result fed back according to the survey information to the central control terminal.

In a third aspect, an embodiment of the present disclosure provides a central control end, which includes a memory and a processor, where the memory stores a computer program, and the computer program, when being executed by the processor, implements the data transmission method in the first aspect.

In a fourth aspect, an embodiment of the present disclosure provides a mobile terminal, including a memory and a processor, where the memory stores a computer program, and the computer program, when being executed by the processor, implements the data transmission method in the second aspect.

In a fifth aspect, an embodiment of the present disclosure provides a data transmission system, which includes the central control terminal in the third aspect and at least one mobile terminal in the fourth aspect.

BRIEF DESCRIPTION OF DRAWINGS

The accompanying drawings, which are provided for further understanding of the present disclosure and constitute a part of this specification, are for explaining the present disclosure together with the embodiments of the present disclosure, but are not intended to limit the present disclosure. In the drawings.

DETAIL DESCRIPTION OF EMBODIMENTS

Figure 1:
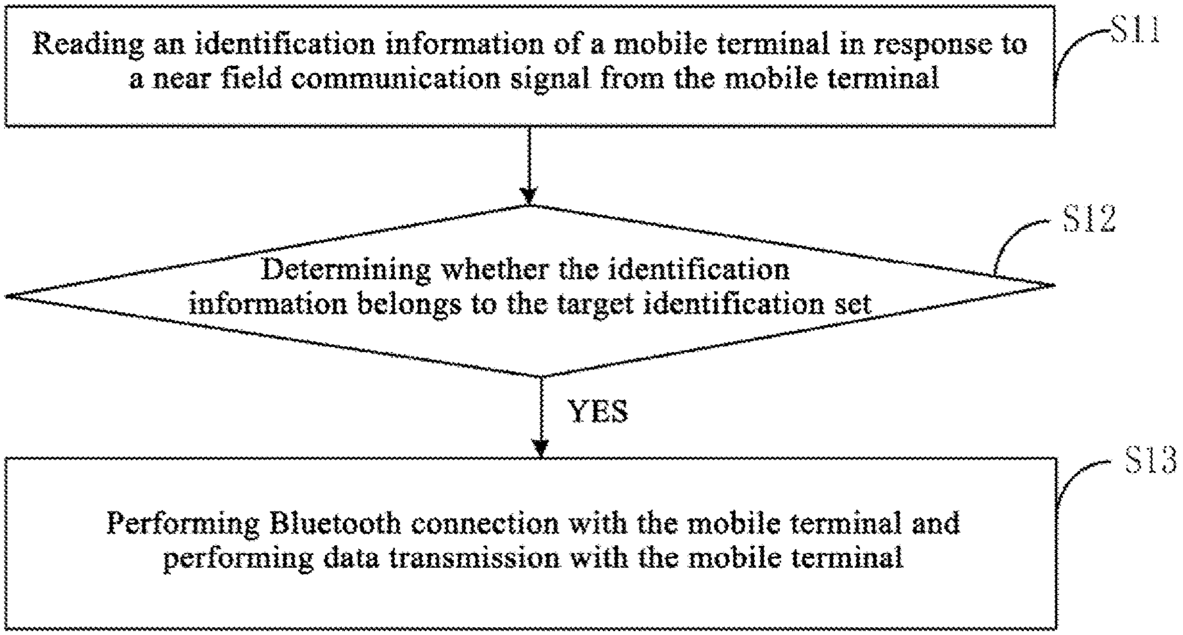
FIG. 1 is a schematic flow chart of a data transmission method according to an embodiment of the present disclosure.

The detail description of embodiments of the present disclosure will be described in further detail with reference to the accompanying drawings. It should be understood that the detail description of embodiments described here is only used to illustrate and explain the present disclosure, but not limit the present disclosure.

To make the objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few, not all of, embodiments of the present disclosure. All other embodiments, which can be derived by a person skilled in the art from the embodiments of the present disclosure without any creative effort, are within the protective scope of the present disclosure.

Unless defined otherwise, technical or scientific terms used herein shall have the ordinary meaning as understood by one of ordinary skill in the art to which the present disclosure belongs. The terms “first”, “second”, and the like used in the present disclosure are not intended to indicate any order, quantity, or importance, but rather are used for distinguishing one element from another. The term of “comprising”, “including”, or the like, means that the element or item preceding the term contains the element or item listed after the term and its equivalent, but does not exclude other elements or items. The term “connected”, “coupled”, or the like is not limited to physical or mechanical connections, but may include electrical connections, whether direct or indirect connections. The terms “upper”, “lower”, “left”, “right”, and the like are used only for indicating relative positional relationships, and when the absolute position of an object being described is changed, the relative positional relationships may also be changed accordingly.

The conference is a communication mode for enterprise management, and with the rapid development of information technology, the limitation of the traditional paper conference mode mainly based on listening and speaking is increasingly obvious, and the application of an electronic device to a conference place gradually becomes a trend.

However, the data transmission of the electronic device in a conference scene mostly depends on a wireless network, and thus, has an extremely high requirement on the stability of the network, the sharing of conference materials is greatly influenced by the unstable network, and other data transmission modes such as file transmission, sign-in statistics, information survey and image screen projection can be influenced by the unstable network. The wireless network cannot guarantee the security of a network environment, which easily causes the leakage of the conference materials. On the other hand, in a network-free environment, the data transmission by using a USB flash disk is complex and is not suitable for a multi-person case.

FIG. 1 is a schematic flow chart of a data transmission method according to an embodiment of the present disclosure.

In order to solve the above problem, an embodiment of the present disclosure provides a data transmission method, which is applied to a central control terminal. As shown in FIG. 1, the data transmission method includes:

S11, reading an identification information of a mobile terminal in response to a near field communication signal (an NFC signal) from the mobile terminal.

The central control terminal in the embodiment of the present disclosure may be a large-sized display terminal for displaying conference materials in a conference scene, and may perform data transmission with mobile terminals simultaneously, so as to improve data transmission efficiency and convenience. The mobile terminal may be a mobile phone.

Specifically, the central control terminal opens a near field communication function, and then enters into a detection state. The central control terminal detects the near field communication signal sent by the mobile terminal when the mobile terminal approaches the central control terminal, reads the identification information carried by the near field communication signal in response to the near field communication signal, and determines whether the identification information belongs to a target identification set.

The near field communication technology is a short-distance high-frequency wireless communication technology, and allows non-contact point-to-point data transmission between electronic devices. When the electronic devices open the respective near field communication functions and are arranged within a preset distance, a radio frequency signal is generated between the electronic devices for data transmission. The preset distance may be 10 cm or 5 cm, which is not limited in the present disclosure.

S12, determining whether the identification information belongs to the target identification set.

S13, performing Bluetooth connection with the mobile terminal and performing data transmission with the mobile terminal when the identification information belongs to the target identification set.

Specifically, when the central control terminal determines that the identification information belongs to the target identification set, the central control terminal is connected to the mobile terminal in a Bluetooth mode and transmits data with the mobile terminal in a Bluetooth communication mode.

It should be noted that the identification set is pre-stored in the central control terminal. In one example, before a conference starts, a staff enters the identification information of all attendees in advance into the central control terminal to form the identification set. After reading the identification information of the mobile terminal, it is to determine whether the identification information belongs to the pre-stored identification set; if so, a near field communication module of the central control terminal sends a communication instruction to a Bluetooth module, to establish the Bluetooth connection between the Bluetooth module of the central control terminal and the mobile terminal for the data transmission; if not, the identity authentication fails, and the Bluetooth connection between the Bluetooth module of the central control terminal and the mobile terminal is not established.

In one example, the identification information may be job numbers ID of the attendees, each of which is bound in the near field communication module of the mobile terminal corresponding to the attendee. When the mobile terminal is connected to the central control terminal in the near field communication mode, the near field communication signal sent by the mobile terminal to the central control terminal carries information of the job number ID thereof, the central control terminal matches the job number ID with the plurality of job numbers ID in the pre-stored identification set. When the matching is successful, the near field communication modules of the two electronic devices respectively send signals to the respective Bluetooth modules to start the Bluetooth communication, to establish the Bluetooth communication between the central control terminal and the mobile terminal, and perform the data transmission based on the Bluetooth communication mode. The data transmission may include: transmission of pictures, transmission of audio, and the like.

The data transmission method provided by the embodiment of the present disclosure is applied to the central control terminal, the identification information of the mobile terminal is acquired through the near field communication signal, and when the identification information belongs to the target identification set, the central control terminal is connected to the mobile terminal in the Bluetooth connection mode and performs the data transmission with the mobile terminal. Compared with the prior art, whether in the stage in which the identity authentication is performed according to the identification information or in the stage of the data transmission after the successful identity authentication, the data transmission method provided by the embodiment of the present disclosure does not depend on a wireless network, and performs the data transmission with at least one mobile terminal in combination with the near field communication and the Bluetooth communication, so that the convenience of the data transmission is improved. When the central control terminal is used in a conference system, the attendees may transmit data without the wireless network, so that the safety and stability of the data transmission are ensured, and a USB flash disk is not required to be used for sharing data, so that the efficiency of the data transmission is improved.

Figure 2:
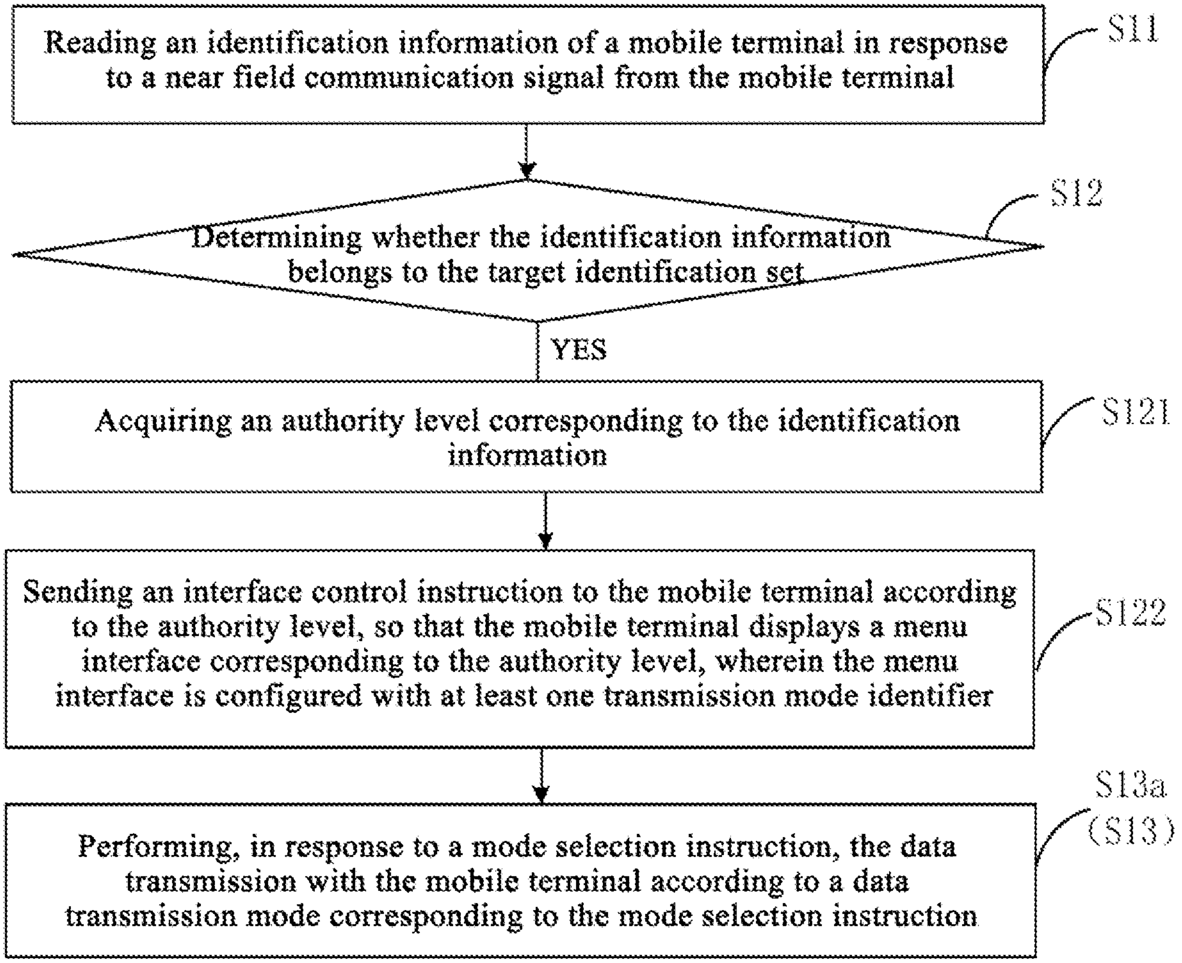
FIG. 2 is another schematic flow chart of a data transmission method according to an embodiment of the present disclosure.

FIG. 2 is another schematic flow chart of a data transmission method according to an embodiment of the present disclosure.

As shown in FIG. 2, the data transmission method includes the steps S11 to S13, and when it is determined in the step S12 that the identification information belongs to the target identification set, the data transmission method further includes steps S121 to S122:

S121, acquiring an authority level corresponding to the identification information.

S122, sending an interface control instruction to the mobile terminal according to the authority level, so that the mobile terminal displays a menu interface corresponding to the authority level, wherein the menu interface is configured with at least one transmission mode identifier.

In one example, the interface control instruction is generated by the central control terminal according to the authority level corresponding to the identification information; and after the central control terminal sends the interface control instruction to the mobile terminal, the mobile terminal displays the menu interface corresponding to the authority level in response to the interface control instruction, and the menu interface is configured with the at least one transmission mode identifier.

In this case, the "performing data transmission with the mobile terminal" in step S13 includes:

S13*a*, in response to a mode selection instruction, performing, by the central control terminal, the data transmission with the mobile terminal according to a data transmission mode corresponding to the mode selection instruction; wherein the mode selection instruction is an instruction generated by the mobile terminal in response to the transmission mode identifier selected by the user.

In one example, the mobile terminal generates the mode selection instruction in response to the transmission mode identifier selected by the user, and sends the mode selection instruction to the central control terminal; and after receiving the mode selection instruction, the central control terminal performs the data transmission with the mobile terminal according to the data transmission mode corresponding to the mode selection instruction.

In one example, the central control terminal pre-stores therein the identification set of the identification information of all the attendees, and the authority levels corresponding to the identification information. The central control terminal may determine at least one transmission mode which may be operated by the attendees according to the authority levels of the attendees. That is, the central control terminal sends the interface control instruction to the mobile terminal according to the authority level so that the mobile terminal displays the menu interface corresponding to the authority level, and the menu interface is configured with the at least one transmission mode identifier.

In one example, the job numbers ID of the attendees are 001, 002, 003, respectively, and the authority levels are high, medium, and low, respectively, and the transmission modes that may be selected by the attendees having different authority levels are not completely different from each other.

For example, the transmission modes that may be selected by a high-authority attendee (i.e., the attendee having the high authority level) include: a first transmission mode, a second transmission mode, a third transmission mode, and a fourth transmission mode; the transmission modes that may be selected by a medium-authority attendee (i.e., the attendee having the medium authority level) include: the second transmission mode, the third transmission mode, and the fourth transmission mode; the transmission modes that may be selected by a low-authority attendee (i.e., the attendee having the low authority level) include: the third transmission mode, and the fourth transmission mode;

Illustratively, the first transmission mode may be file transmission, the second transmission mode may be image screen projection, the third transmission mode may be file/material distribution, and the fourth transmission mode may be sign-in and/or information survey.

Figure 3:
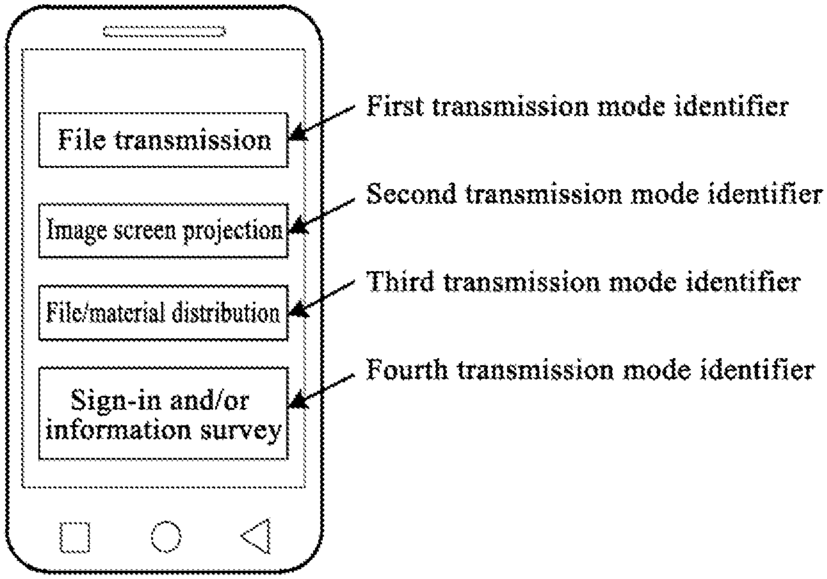
FIG. 3 is a schematic diagram of a menu interface according to an embodiment of the present disclosure.

FIG. 3 is a schematic diagram of a menu interface according to an embodiment of the present disclosure.

After the Bluetooth communication is established between the mobile terminal of the attendee with the job number ID of 001 and the high authority level and the central control terminal, the central control terminal acquires the high authority level corresponding to the attendee through the job number ID, and it is determined according to the high authority of the attendee: the transmission modes that may be selected by the attendee are four transmission modes, that is, the central control terminal sends the interface control instruction to the mobile terminal, so that the mobile terminal displays a menu interface as shown in FIG. 3 on which transmission mode identifiers (i.e., a first transmission mode identifier, a second transmission mode identifier, a third transmission mode identifier and a fourth transmission mode identifier) of the four transmission modes are displayed, so that the attendee with the job number of 001 and the high authority level may select a required data transmission mode on the mobile terminal.

According to the data transmission method provided by the embodiment of the present disclosure, the operable transmission modes on the mobile terminal are determined according to the identification information and the authority levels. That is, the operable transmission modes are configured for the attendees according to the identification information and the authority levels, so that the attendees with different authority levels may use different transmission modes, and the problems of complex data transmission and leakage risk of file information in a multi-person conference are solved.

The following describes various transmission modes of the data transmission in detail with reference to specific embodiments.

First Embodiment, The First Transmission Mode: The File Transmission

For the first transmission mode, in some embodiments, the step S13*a* may include: step A1, performing, by the central control terminal, a file transmission operation in response to a first mode selection instruction sent by the mobile terminal.

The first mode selection instruction is generated by the mobile terminal in response to the first transmission mode identifier selected by the user. That is, the user selects the first transmission mode identifier on the menu interface shown in FIG. 3, and the mobile terminal generates the first mode selection instruction in response to the first transmission mode identifier selected by the user.

The "performing the file transmission operation" in step A1 includes: in response to a first file selection instruction, sending a first file corresponding to the first file selection instruction to the mobile terminal; and/or receiving a second file sent by the mobile terminal.

In one example, at least one transmission mode identifier, including the first transmission mode identifier, is displayed in the interface menu of the mobile terminal. When the user selects the first transmission mode identifier, the mobile terminal generates the first mode selection instruction and sends the first mode selection instruction to the central control terminal. The central control terminal performs the file transmission operation with the mobile terminal in response to the first mode selection instruction.

It should be noted that the file transmission operation may be that the central control terminal sends a file to the mobile terminal, that is, the central control terminal selects the first file at a preset storage location in response to the first file selection instruction, and sends the first file to the mobile terminal; the file transmission operation may alternatively be that the central control terminal receives the file sent by the mobile terminal, specifically, after the user inputs a second file selection instruction to the mobile terminal, the mobile terminal selects the second file at the preset storage position in response to the second file selection instruction, and sends the second file to the central control terminal.

In the above embodiments, when the central control terminal receives the first mode selection instruction from the mobile terminal, the file transmission with the mobile terminal is directly performed. In other embodiments, when the central control terminal receives the first mode selection instruction from the mobile terminal, a password verification with the mobile terminal may be firstly performed, to determine whether to perform the file transmission according to a password verification result. Specifically, in other embodiments, the step S13*a* may include:

Step A2, performing the password verification with the mobile terminal in response to the first mode selection instruction sent by the mobile terminal.

Step B2, when the password is successfully verified, performing the file transmission operation.

The "performing the file transmission operation" in step B2 includes: in response to the first file selection instruction, sending the first file corresponding to the first file selection instruction to the mobile terminal; and/or receiving the second file sent by the mobile terminal.

Figure 4A:
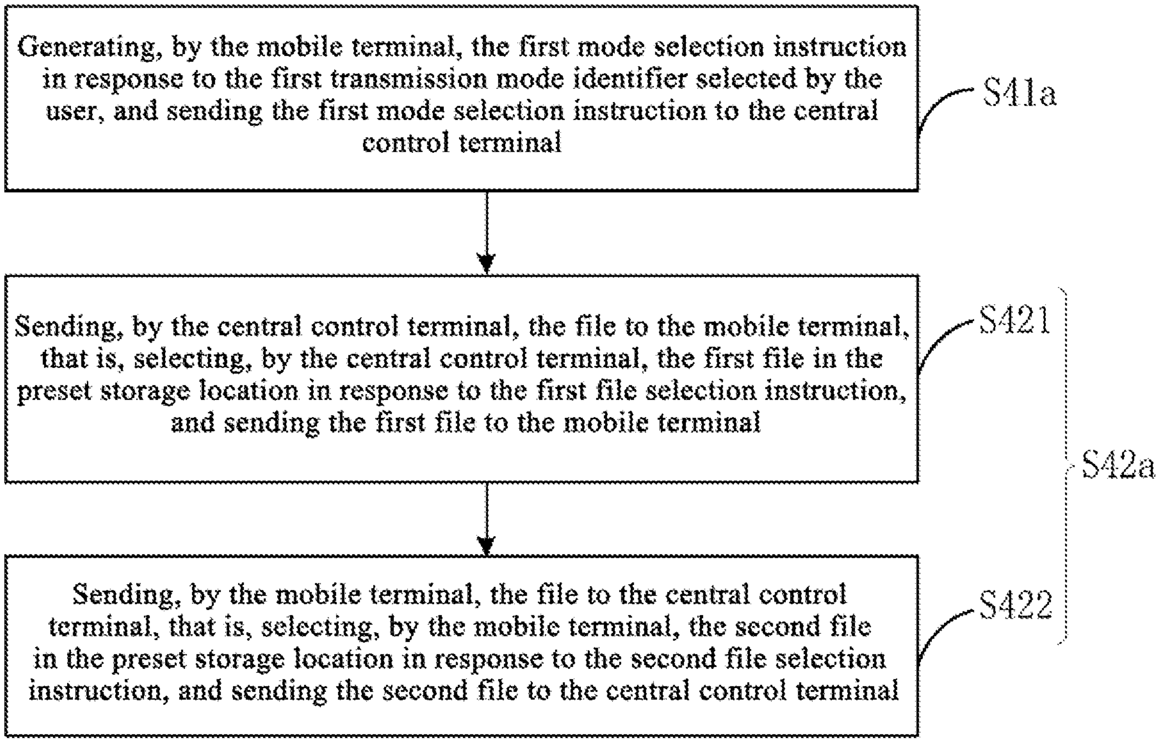
FIG. 4A is a schematic diagram of a file transmission process according to an embodiment of the present disclosure.

The file transmission process between the central control terminal and the mobile terminal is described below in detail with reference to specific drawings. FIG. 4A is a schematic diagram of a file transmission process according to an embodiment of the present disclosure. As shown in FIG. 4A, the file transmission process includes:

Step S41*a*, generating, by the mobile terminal, the first mode selection instruction in response to the first transmission mode identifier selected by the user, and sending the first mode selection instruction to the central control terminal.

Step S42*a*, performing, by the central control terminal, the file transmission operation in response to the first mode selection instruction.

The file transmission operation may include S421, in which the central control terminal sends the file to the mobile terminal, that is, the central control terminal selects the first file in the preset storage location in response to the first file selection instruction, and sends the first file to the mobile terminal. The file transmission operation may also include S422, in which the mobile terminal sends the file to the central control terminal, that is, the mobile terminal selects the second file in the preset storage location in response to the second file selection instruction, and sends the second file to the central control terminal. The first file selection instruction may be an instruction input by the user to the central control terminal, and the instruction may be sent to the central control terminal through a key, a remote controller and other devices. The second file selection instruction may be an instruction input by the user to the mobile terminal, and the instruction may be input through touch operation.

Figure 4B:
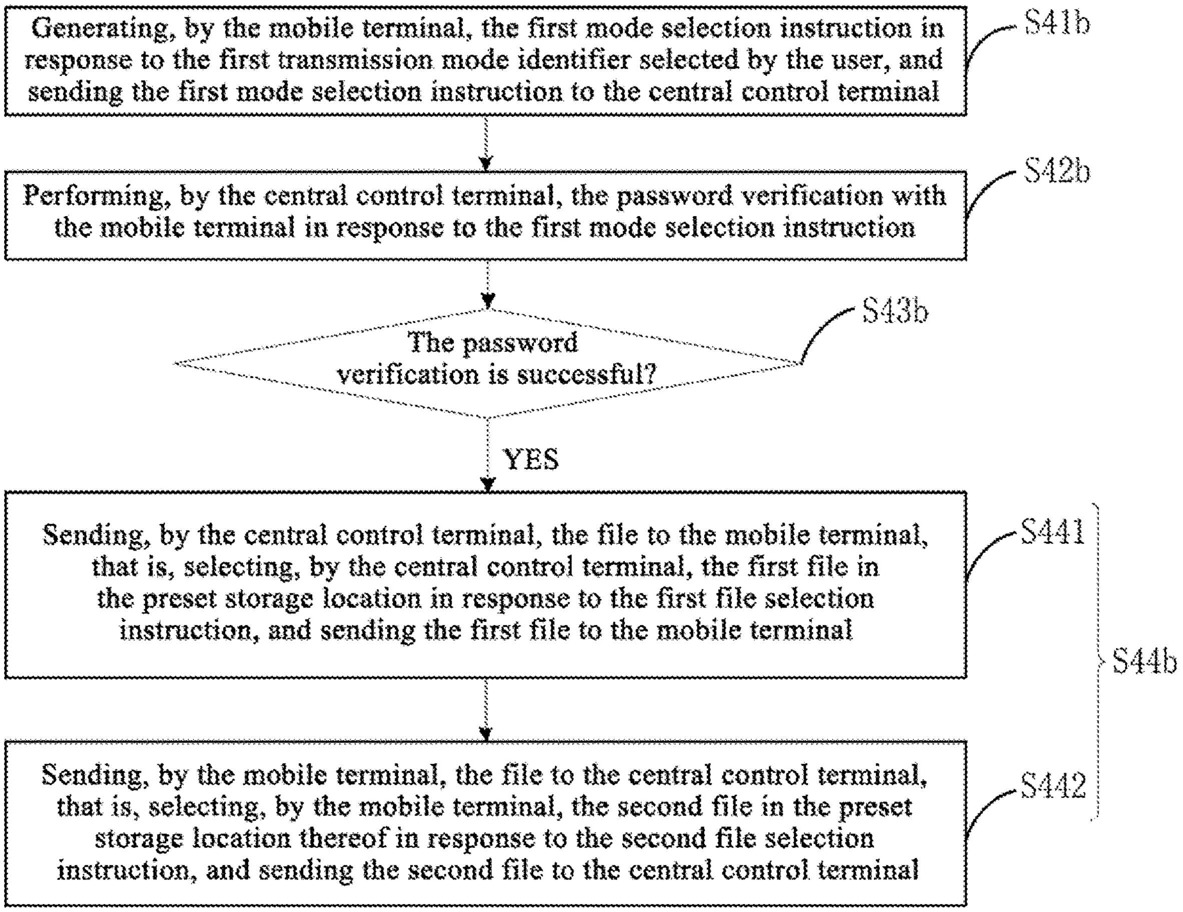
FIG. 4B is another schematic diagram of a file transmission process according to an embodiment of the present disclosure.

FIG. 4B is another schematic diagram of a file transmission process according to an embodiment of the present disclosure. As shown in FIG. 4B, the file transmission process includes:

Step S41*b*, generating, by the mobile terminal, the first mode selection instruction in response to the first transmission mode identifier selected by the user, and sending the first mode selection instruction to the central control terminal.

Step S42*b*, performing, by the central control terminal, the password verification with the mobile terminal in response to the first mode selection instruction.

Step S43*b*, determining, by the central control terminal, whether the password verification is successful, and if so, performing step S44*b*.

In one example, the password verification may include: the central control terminal determines whether the password fed back by the mobile terminal is the same as a password configured for the mobile terminal in advance. A password may be configured for the mobile terminal in advance according to the identification information of the mobile terminal, so that the passwords of the mobile terminals of all the attendees are different from each other, thereby improving the security of the password verification; alternatively the password may be configured for the mobile terminal in advance according to conference information (such as a conference time, a conference session and a conference room number), so that a plurality of attendees in the same conference use the same password, thereby reducing the complexity of the password verification.

In an example, in the case that the password verification fails, that is, the password fed back by the mobile terminal is inconsistent with the password configured for the mobile terminal in advance, the central control terminal may send a password error prompt to the mobile terminal, the mobile terminal may re-enter the password in response to the password error prompt. After the central control terminal monitors that the number of times of the password error fed back by the mobile terminal exceeds a preset number of times, the central control terminal disconnects the Bluetooth connection with the mobile terminal.

Step S44*b*, performing the file transmission operation between the central control terminal and the mobile terminal.

The file transmission operation may include S441, in which the central control terminal sends the file to the mobile terminal, that is, the central control terminal selects the first file in the preset storage location in response to the first file selection instruction, and sends the first file to the mobile terminal. The file transmission operation may also include S442, in which the mobile terminal sends the file to the central control terminal, that is, the mobile terminal selects the second file in the preset storage location thereof in response to the second file selection instruction, and sends the second file to the central control terminal. The first file selection instruction may be an instruction input by the user to the central control terminal, and the instruction may be sent to the central control terminal through a key, a remote controller and other devices. The second file selection instruction may be an instruction input by the user to the mobile terminal, and the instruction may be input through touch operation.

Second Embodiment: The Second Transmission Mode: The Image Screen Projection For the second transmission mode, the step S13*a* may include: acquiring, by the central control terminal, an image sent by the mobile terminal in response to a second mode selection instruction sent by the mobile terminal and controlling the display screen to display the image.

The second mode selection instruction is generated by the mobile terminal in response to the second transmission mode identifier selected by the user.

It should be noted that before the mobile terminal generates the second mode selection instruction, the user may adjust a display interface of the mobile terminal into an image to be displayed on the display screen, then move the mobile terminal close to the central control terminal, to establish communication connection through the near field communication and the Bluetooth communication sequentially, and then send the second mode selection instruction to the central control terminal, the central control terminal acquires an image that is displayed after the menu interface of the mobile terminal is closed, and controls the display screen to display the image.

Figure 5:
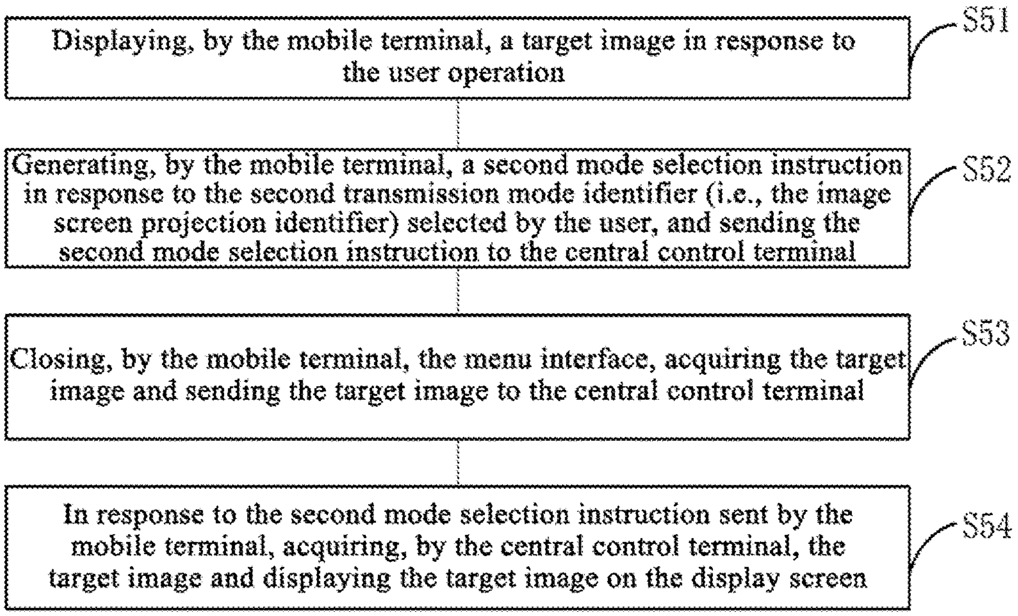
FIG. 5 is a schematic diagram of an image screen projection process according to an embodiment of the present disclosure.

FIG. 5 is a schematic diagram of an image screen projection process according to an embodiment of the present disclosure. As shown in FIG. 5, the image screen projection process includes:

Step S51, displaying, by the mobile terminal, a target image in response to the user operation.

Step S52, generating, by the mobile terminal, a second mode selection instruction in response to the second transmission mode identifier (for example, the image screen projection identifier) selected by the user, and sending the second mode selection instruction to the central control terminal.

Step S53, closing, by the mobile terminal, the menu interface, acquiring the target image and sending the target image to the central control terminal. The target image may be an image displayed currently on the display interface of the mobile terminal.

Step S54, acquiring, by the central control terminal, the target image in response to the second mode selection instruction sent by the mobile terminal and displaying the target image on the display screen.

It should be noted that after the central control terminal acquires the target image, the target image is temporarily stored in the preset storage position, and after the central control terminal does not display the target image in response to a user operation instruction, the target image is automatically deleted by the central control terminal from the preset storage position.

According to the data transmission method provided by the embodiment of the present disclosure, after the Bluetooth connection is established between the mobile terminal and the central control terminal, the image currently displayed by the mobile terminal may be quickly sent to the central control terminal based on the second mode selection instruction, so that the central control terminal controls the display screen to display the image, and the quick screen projection is realized. In this way, the conference efficiency can be improved. By combining the operable transmission mode configured for the user according to the authority level, only the attendee having the preset authority may perform the screen projection operation, so that the safety of the data transmission through the screen projection operation is further improved.

Third Embodiment: The Third Transmission Mode: The File/Material Distribution For the third transmission mode, in some embodiments, the step S13*a* may include the following steps A3 to C3 performed by the central control terminal:

Step A3, acquiring a category identifier of the mobile terminal in response to a third mode selection instruction sent by the mobile terminal.

The third mode selection instruction is generated by the mobile terminal in response to the third transmission mode identifier selected by the user. That is, the user selects the third transmission mode identifier (for example, a file/material distribution identifier) on the menu interface shown in FIG. 3, and the mobile terminal generates the third mode selection instruction in response to the third transmission mode identifier selected by the user.

Step B3, determining an identity label of the mobile terminal according to the authority level and the category identifier of the mobile terminal.

It should be noted that the category identifier, the authority level, and the identity authentication information are all pre-stored in the central control terminal. Namely, the central control terminal pre-stores the identity authentication information (the job number ID) of each attendee, and the corresponding authority level and the corresponding category identifier. The category identifier may represent department information, group information, and the like of the attendees.

In one example, the authority level includes three authority levels, namely high authority level, medium authority level, and low authority level; the category identifier includes three identifier, namely A, B, C identifiers. The three authority levels and the three identifiers are subjected to a permutation and combination operation to obtain nine combination modes, and the corresponding identity labels are distributed according to the nine combination modes. For example, the identity label for the attendee having the high authority level and category A is 1, and the identity label for the attendee having the low authority level and category C is 9.

Step C3, selecting at least one target file from a pre-stored file set, where a plurality of third files are stored in the file set, each of the third file is labeled with a corresponding file label, and the target file is a third file labeled with a file label consistent with the identity label.

It should be noted that the third file may be labeled with one or more file labels. In a case that third file is labeled with more file labels, the "the target file is a third file with a labeled file label consistent with the identity label" in the step C3 means that at least one of the labels of the third file is consistent with the identity label.

In one example, corresponding file labels are configured for the third files in advance. For example, important files related to department A corresponding to category A can only be viewed by high-authority category A attendee, and the file labels are configured to be 1; and common files related to the department A corresponding to the category A may be viewed by all the category A attendees, namely the category A attendees with the high authority level, the medium authority level and the low authority level, and thus the file labels are configured to be 1, 2 and 3.

After receiving the third mode selection instruction sent by the mobile terminal, the identity label corresponding to the mobile terminal is acquired, all third files are traversed, and all third files having the file labels consistent with the identity label are selected, so that selected third files are files which may be viewed by a user of the mobile terminal.

Step D3, sending, by the central control terminal, the at least one target file to the mobile terminal.

It should be noted that the file/material distribution in this embodiment refers to a process of sending the file from the central control terminal to at least one mobile terminal.

For the third transmission mode, in other embodiments, the step S13*a* may include the following steps A4 to E4 executed by the central control terminal:

Step A4, performing the password verification with the mobile terminal in response to the third mode selection instruction sent by the mobile terminal.

Step B4, when the password verification is successful, acquiring the category identifier of the mobile terminal.

Step C4, determining the identity label of the mobile terminal according to the authority level and the category identifier of the mobile terminal.

Step D4, selecting at least one target file from the pre-stored file set, where a plurality of third files are stored in the file set, each of the third file is labeled with a corresponding file label, and the target file is a third file with a labeled file label consistent with the identity label.

Step E4, sending the at least one target file to the mobile terminal.

Figure 6A:
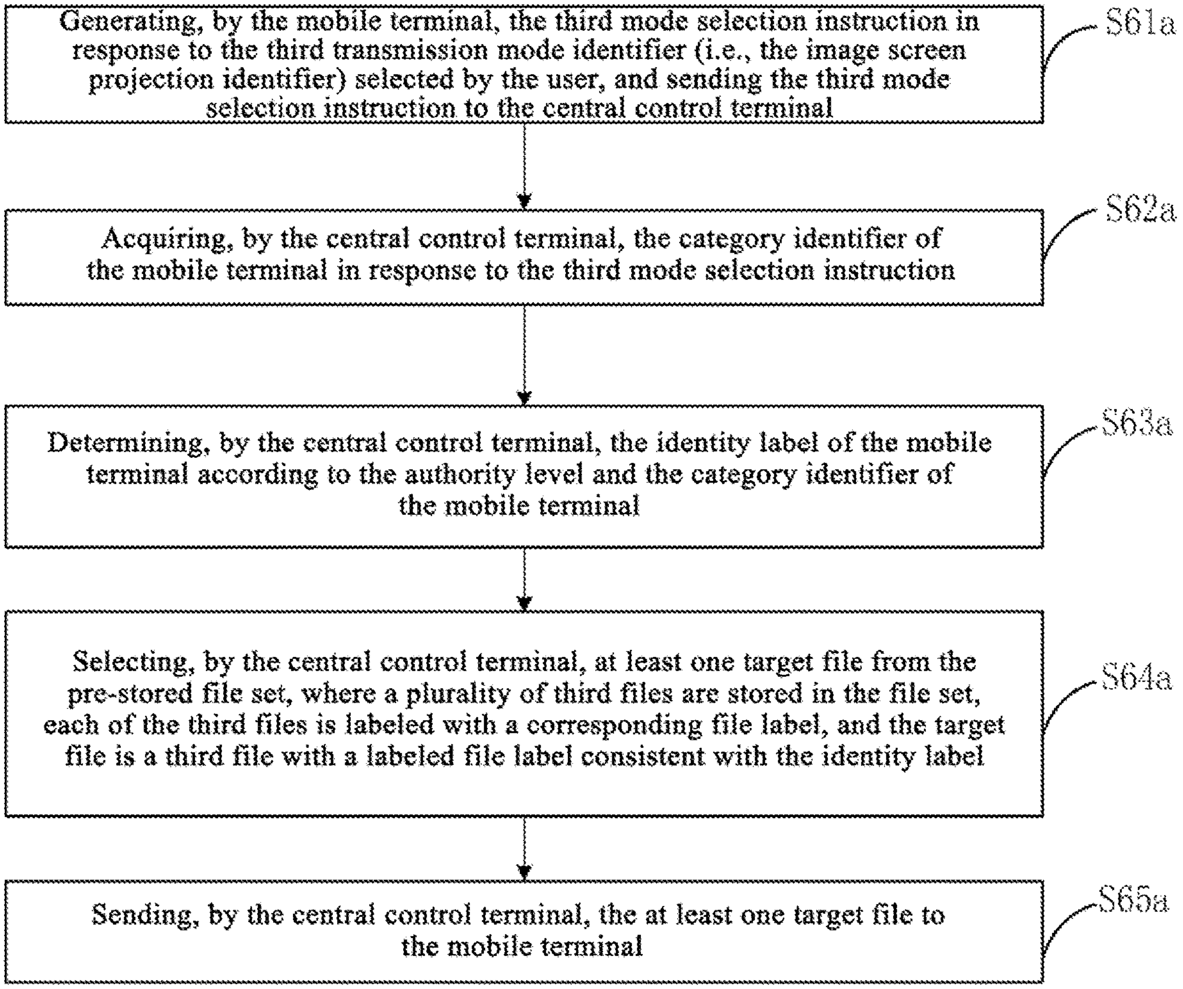
FIG. 6A is a schematic diagram of a file/material distribution process according to an embodiment of the present disclosure.

FIG. 6A is a schematic diagram of a file/material distribution process according to an embodiment of the present disclosure. As shown in FIG. 6A, the file/material distribution process includes:

Step S61*a*, generating, by the mobile terminal, the third mode selection instruction in response to the third transmission mode identifier (for example, the image screen projection identifier) selected by the user, and sending the third mode selection instruction to the central control terminal.

Step S62*a*, acquiring, by the central control terminal, the category identifier of the mobile terminal in response to the third mode selection instruction sent by the mobile terminal.

Step S63*a*, determining, by the central control terminal, the identity label of the mobile terminal according to the authority level and the category identifier of the mobile terminal.

Step S64*a*, selecting, by the central control terminal, at least one target file from the pre-stored file set, where the plurality of third files are stored in the file set, each of the third files is labeled with a corresponding file label, and the target file is a third file labeled with a file label consistent with the identity label.

Step S65*a*, sending, by the central control terminal, the at least one target file to the mobile terminal.

Figure 6B:
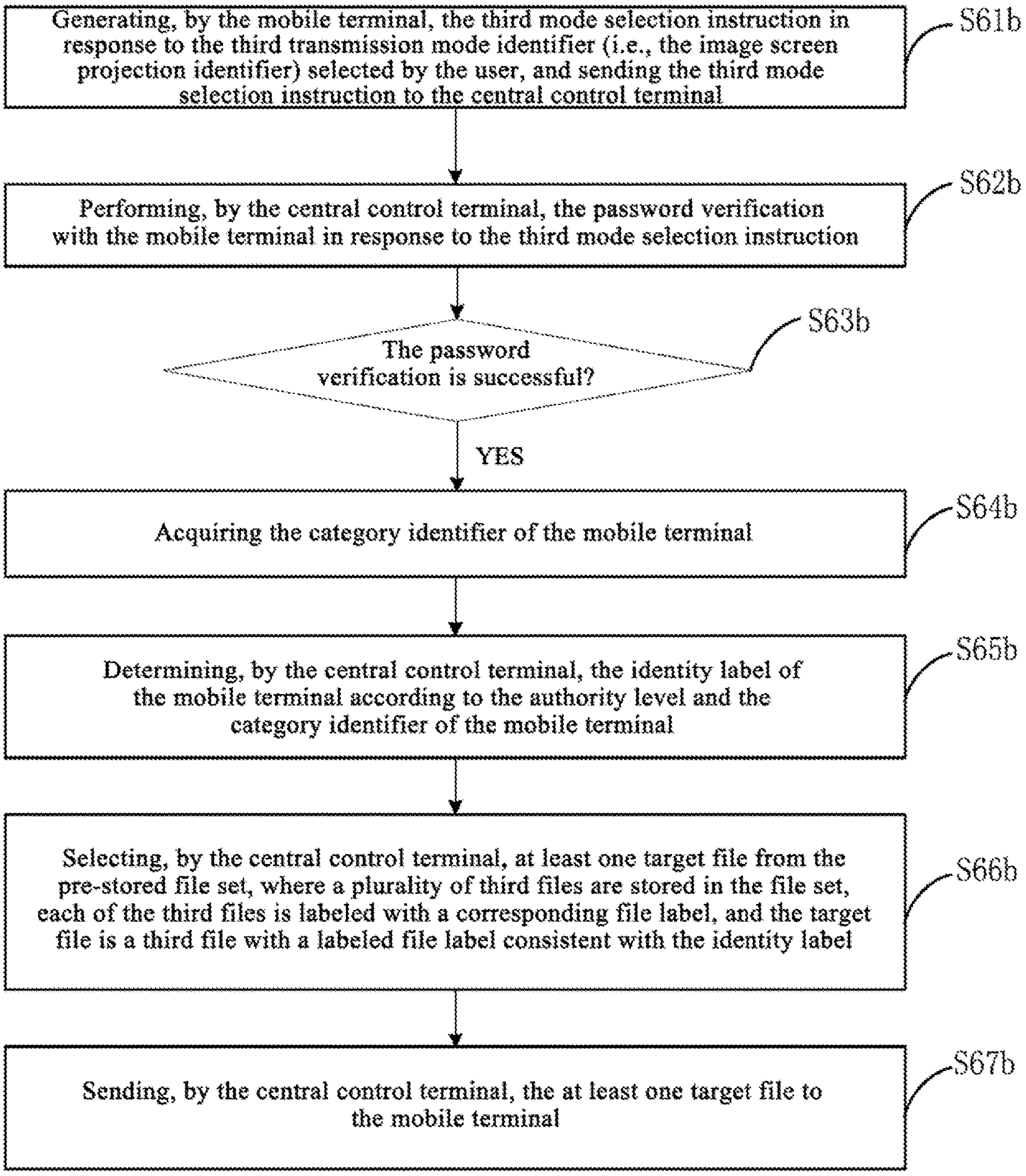
FIG. 6B is another schematic diagram of a file/material distribution process according to an embodiment of the present disclosure.

FIG. 6B is another schematic diagram of a file/material distribution process according to an embodiment of the present disclosure. As shown in FIG. 6B, the file/material distribution process includes:

Step S61*b*, generating, by the mobile terminal, the third mode selection instruction in response to the third transmission mode identifier (for example, the image screen projection identifier) selected by the user, and sending the third mode selection instruction to the central control terminal.

Step S62*b*, performing, by the central control terminal, the password verification with the mobile terminal in response to the third mode selection instruction sent by the mobile terminal.

Step S63*b*, determining whether the password verification is successful, and if so, S64*b* is executed.

The password verification in this embodiment is the same as the password verification in the file transmission described above, and is not described herein again.

Step S64*b*, acquiring, by the central control terminal, the category identifier of the mobile terminal.

Step S65*b*, determining, by the central control terminal, the identity label of the mobile terminal according to the authority level and the category identifier of the mobile terminal.

Step S66*b*, selecting, by the central control terminal, at least one target file from the pre-stored file set, where the plurality of third files are stored in the file set, each of the third files is labeled with a corresponding file label, and the target file is a third file with a labeled file label consistent with the identity label.

Step S67*b*, sending, by the central control terminal, the at least one target file to the mobile terminal.

In the data transmission method disclosed by the embodiment of the present disclosure, the identity label of the mobile terminal is determined according to the category identifier and the authority level of the mobile terminal, and the at least one target file having the file label consistent with the identity label is sent to the mobile terminal. The method ensures that the attendees can only view the relevant files in the own authority, and the files are not distributed in disorder even in the conference, so that the convenience of the data transmission is fully embodied, and the security of the data transmission is improved by combining the password verification.

Fourth Embodiment: The Fourth Transmission Mode: The Sign-In and/or Information Survey For the fourth transmission mode, in some embodiments, the step S13*a* may include the following steps A5 to C5 performed by the central control terminal:

Step A5, recording current time and the identification information of the mobile terminal in response to a fourth mode selection instruction sent by the mobile terminal.

In the step A5, a conference time of the attendee corresponding to the mobile terminal is recorded by recording the current time and the identification information of the mobile terminal. The staff may form a conference time table with the conference time of the plurality of attendees, and store the conference time table in the preset storage position of the central control terminal as the sign-in information.

Step B5, sending a prompt instruction to the mobile terminal in response to the fourth mode selection instruction sent by the mobile terminal, so that the mobile terminal displays prompt information in response to the prompt instruction, wherein the prompt information is used for prompting a user to input survey information to the mobile terminal.

Step C5, receiving a survey result fed back by the mobile terminal according to the survey information.

It should be noted that the sign-in process in step A2 based on the fourth mode selection instruction and the information survey process in step B2 based on the fourth mode selection instruction may be performed simultaneously, or only one of them may be performed, which is not limited in this disclosure.

Figure 7:
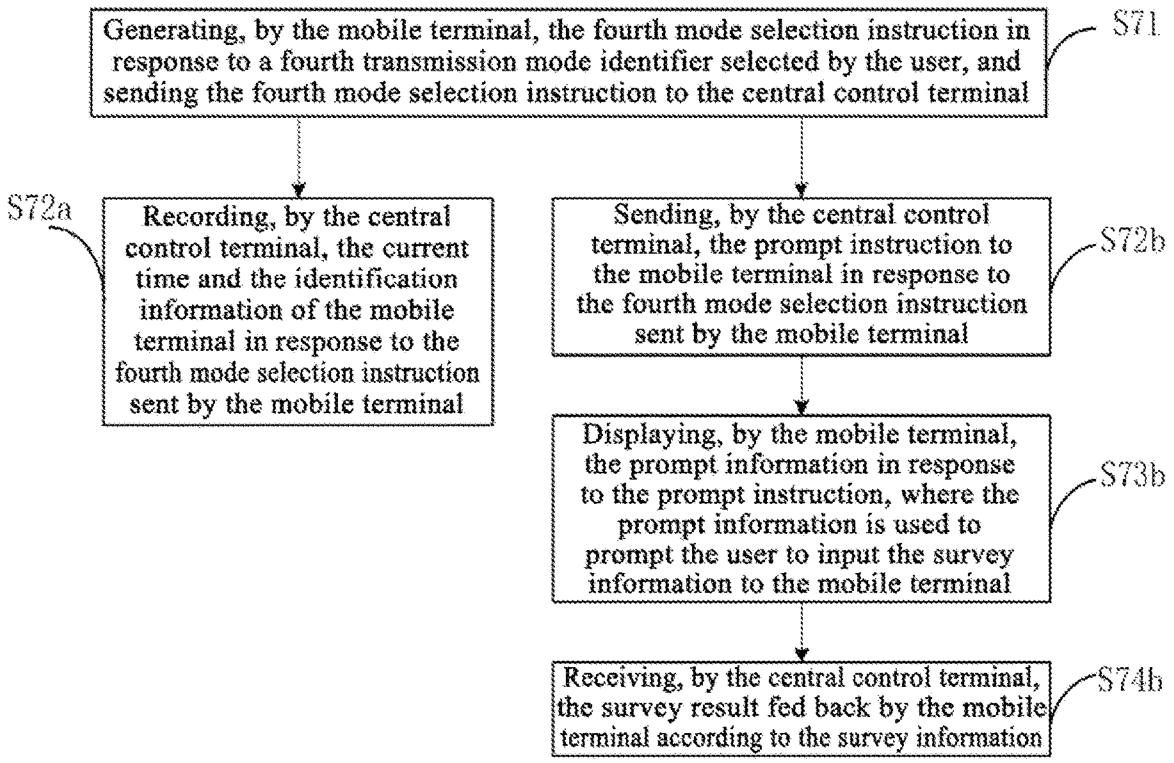
FIG. 7 is a schematic diagram of a process of sign-in and/or information survey according to an embodiment of the present disclosure.

FIG. 7 is a schematic diagram of a process of sign-in and/or information survey according to an embodiment of the present disclosure. As shown in FIG. 7, the process of sign-in and/or information survey includes:

Step S71, generating, by the mobile terminal, the fourth mode selection instruction in response to a fourth transmission mode identifier selected by the user, and sending the fourth mode selection instruction to the central control terminal.

Then, the sign-in process and/or the survey process are performed, wherein the sign-in process includes step S72*a*, and the survey process includes the following steps S72*b* to S74*b*.

Step S72*a*, recording, by the central control terminal, the current time and the identification information of the mobile terminal in response to the fourth mode selection instruction sent by the mobile terminal.

Step S72*b*, sending, by the central control terminal, the prompt instruction to the mobile terminal in response to the fourth mode selection instruction sent by the mobile terminal.

Step S73*b*, displaying, by the mobile terminal, the prompt information in response to the prompt instruction, where the prompt information is used to prompt the user to input the survey information to the mobile terminal.

Step S74*b*, receiving, by the central control terminal, the survey result fed back by the mobile terminal according to the survey information.

According to the data transmission method provided by the embodiment of the present disclosure, the communication connection is established between the central control terminal and the mobile terminal, the data transmission of the sign-in information and/or the survey information is performed based on the fourth mode selection instruction, and the sign-in information and/or the survey information sent by the mobile terminals are sorted and counted, so that the work efficiency of sign-in/information survey is greatly improved, and the operation may be completed by each attendee at the corresponding mobile terminal, and the complexity of data transmission is reduced.

It should be noted that after the data transmission in any one of the four transmission modes between the central control terminal and the mobile terminal is completed, the Bluetooth connection with the mobile terminal may be immediately disconnected, or the interface control instruction may be sent to the mobile terminal again, so that the mobile terminal displays the menu interface, and further, any one of the transmission modes may be selected again for the data transmission. Immediately disconnecting the Bluetooth connection with the mobile terminal may include the Bluetooth module of the central control terminal is closed to disconnect the Bluetooth connection with the mobile terminal; or the central control terminal sends a data transmission ending instruction to the mobile terminal, so that the Bluetooth module of the mobile terminal is closed to disconnect the Bluetooth connection with the central control terminal.

Figure 8:
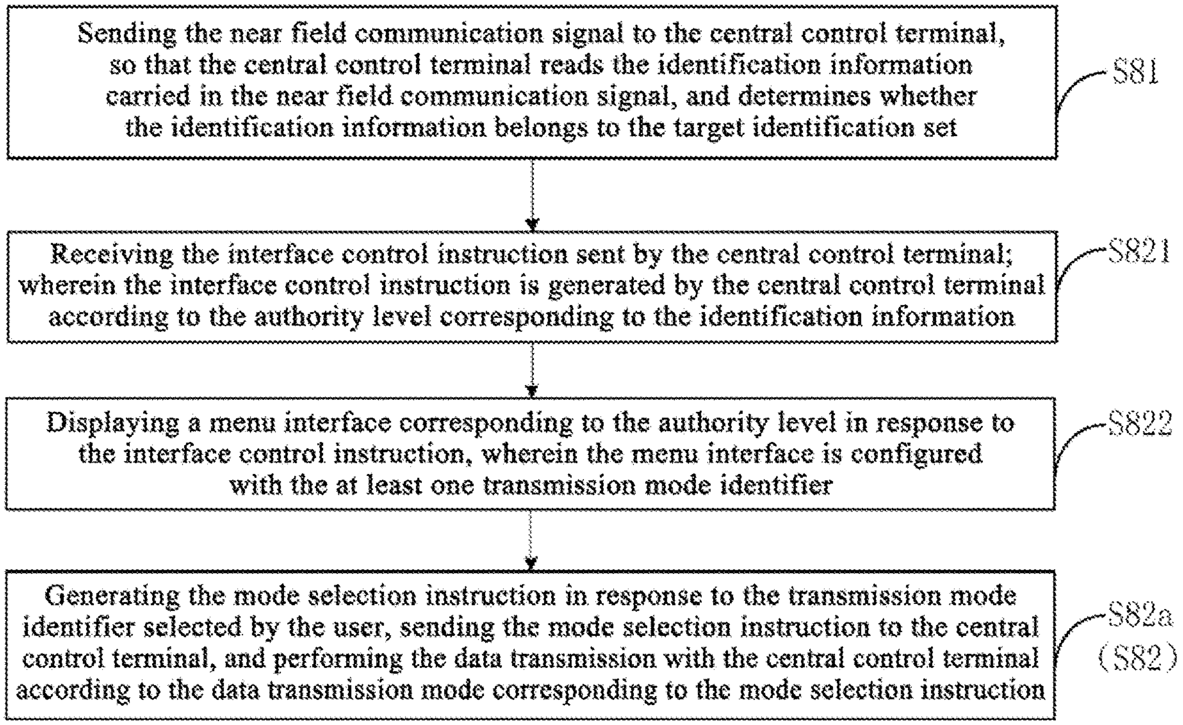
FIG. 8 is another schematic flow chart of a data transmission method according to an embodiment of the present disclosure.

FIG. 8 is another schematic flow chart of a data transmission method according to an embodiment of the present disclosure. The data transmission method is applied to a mobile terminal, and as shown in FIG. 8, the data transmission method includes the following steps S81 to S82 performed by the mobile terminal:

Step S81, sending the near field communication signal to the central control terminal, so that the central control terminal reads the identification information carried in the near field communication signal, and determines whether the identification information belongs to the target identification set.

Step S82, when the identification information belongs to the target identification set, performing Bluetooth connection with the central control terminal, and transmitting data with the central control terminal.

In some embodiments, when the identification information belongs to the target identification set in step S82, the data transmission method further includes:

Step S821, receiving the interface control instruction sent by the central control terminal; wherein the interface control instruction is generated by the central control terminal according to the authority level corresponding to the identification information.

Step S822, displaying a menu interface corresponding to the authority level in response to the interface control instruction, wherein the menu interface is configured with the at least one transmission mode identifier.

The "performing the data transmission with the central control terminal" in the step S82 includes:

Step S82*a*, generating the mode selection instruction in response to the transmission mode identifier selected by the user, sending the mode selection instruction to the central control terminal, and performing the data transmission with the central control terminal according to the data transmission mode corresponding to the mode selection instruction.

In some embodiments, the step S82*a* may include: generating the first mode selection instruction in response to the first transmission mode identifier selected by the user; and sending the first mode selection instruction to the central control terminal, so that the central control terminal performs the file transmission operation in response to the first mode selection instruction.

The file transmission operation includes: receiving a first file sent by the central control terminal; and/or sending a second file corresponding to the second file selection instruction to the central control terminal in response to the second file selection instruction.

In some embodiments, the step S82*a* may include: generating the first mode selection instruction in response to the first transmission mode identifier selected by the user; sending the first mode selection instruction to the central control terminal, and performing password verification with the central control terminal; and performing the file transmission operation when the password verification is successful, and the file transmission operation includes: receiving the first file sent by the central control terminal; and/or sending the second file corresponding to the second file selection instruction to the central control terminal in response to the second file selection instruction.

In other embodiments, the step S82*a* may include: generating the second mode selection instruction in response to the second transmission mode identifier selected by the user; sending the second mode selection instruction to the central control terminal; and acquiring an image displayed currently on the display interface, and sending the image to the central control terminal so that the central control terminal controls the display screen to display the image.

In other embodiments, the step S82*a* may include: generating the third mode selection instruction in response to the third transmission mode identifier selected by the user; sending the third mode selection instruction to the central control terminal so that the central control terminal acquires a category identifier of the mobile terminal in response to the third mode selection instruction, determines an identity label of the mobile terminal according to the authority level and the category identifier, and selects at least one target file from the pre-stored file set, wherein the plurality of third files are stored in the file set, each of the third files is labeled with a corresponding file label, and the target file is a third file with a labeled file label consistent with the identity label; and receiving the at least one target file sent from the central control terminal.

In other embodiments, the step S82*a* may include: generating the third mode selection instruction in response to the third transmission mode identifier selected by the user; sending the third mode selection instruction to the central control terminal, and performing password verification with the central control terminal; the central control terminal, based on the third mode selection instruction, acquires the category identifier, determines the identity label of the mobile terminal according to the authority level and the category identifier, and selects at least one target file from the pre-stored file set, wherein the plurality of third files are stored in the file set, each of the third files is labeled with a corresponding file label, and the target file is a third file with a labeled file label consistent with the identity label; and receiving the at least one target file sent by the central control terminal when the password is successfully verified.

In other embodiments, the step S82*a* may include: generating the fourth mode selection instruction in response to the fourth transmission mode identifier selected by the user; sending the fourth mode selection instruction to the central control terminal so that the central control terminal records the current time and the identification information of the mobile terminal; and/or receiving the prompt instruction sent by the central control terminal, and displaying the prompt information in response to the prompt instruction, wherein the prompt information is used for prompting the user to input the survey information; and sending the survey result fed back according to the survey information to the central control terminal.

The data transmission process between the mobile terminal and the central control terminal is described above, and is not described here again.

Figure 9:
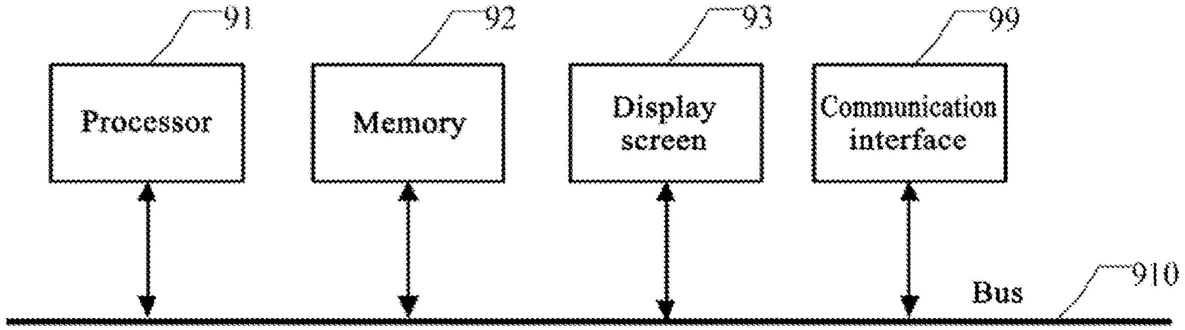
FIG. 9 is a schematic diagram of a structure of a central control terminal according to an embodiment of the present disclosure.

An embodiment of the present disclosure further provides a central control terminal. FIG. 9 is a schematic diagram of a structure of a central control terminal according to an embodiment of the present disclosure. As shown in FIG. 9, the central control terminal includes a memory 92 and a processor 91, a computer program is stored on the memory 92, and when the computer program is executed by the processor 91, to implement the data transmission method shown in FIG. 1 and FIG. 2.

In addition, the central control terminal may further include a display screen 93 for displaying images or video under the control of the processor.

The processor 91 may include a central processing unit (CPU), or an application specific integrated circuit (ASIC), or one or more integrated circuits configured to implement the embodiments of the present disclosure.

The memory 92 may include a mass storage for data or instructions. By way of example, and not limitation, the memory 92 may include a hard disk drive (HDD), a floppy disk drive, a flash memory, an optical disk, a magneto-optical disk, a magnetic tape, or a universal serial bus (USB) drive or a combination of two or more of these. In one example, the memory 92 may include removable or non-removable (or fixed) media, or the memory 92 is non-volatile solid-state memory. The memory 92 may be internal or external to an integrated gateway redundancy device.

In one example, the memory 92 may be a read only memory (ROM). In one example, the ROM may be mask-programmed ROM, programmable ROM (PROM), erasable PROM (EPROM), electrically erasable PROM (EEPROM), electrically alterable ROM (EAROM), or a flash memory, or a combination of two or more of these.

The processor 91 reads and executes the computer program instructions stored in the memory 92 to implement a above tiled display method for servers respectively connected to display units in a tiled screen, and achieve the corresponding technical effects, which are not described herein again for brevity.

In one example, the server may also include a communication interface 99 and a bus 910. As shown in FIG. 9, the processor 91, the memory 92, the display screen 93, and the communication interface 94 are connected together via the bus 910 to complete communication among them.

Figure 10:
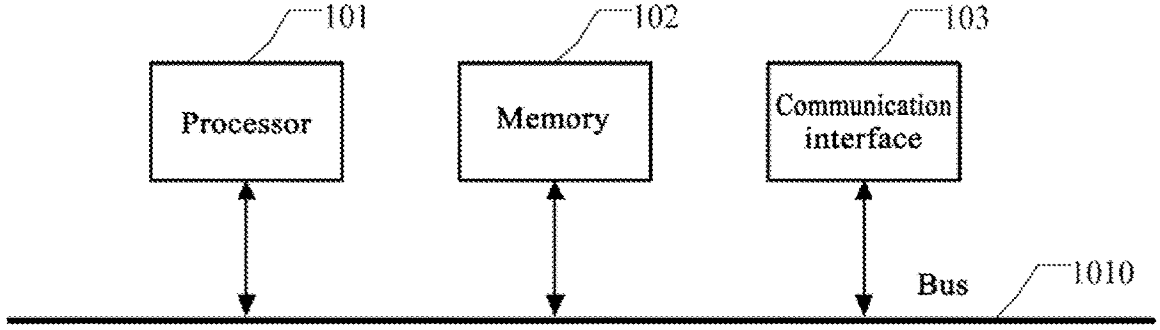
FIG. 10 is a schematic diagram of a structure of a mobile terminal according to an embodiment of the present disclosure.

An embodiment of the present disclosure further provides a mobile terminal. FIG. 10 is a schematic diagram of a structure of a mobile terminal according to an embodiment of the present disclosure. As shown in FIG. 10, the mobile terminal includes a memory 102 and a processor 101, where the memory 102 stores a computer program, and when the computer program is executed by the processor 101, to implement the data transmission method shown in FIG. 8.

Specifically, the processor 101 may include a central processing unit (CPU), or an application specific integrated circuit (ASIC), or one or more integrated circuits configured to implement the embodiments of the present disclosure.

The memory 102 may include a mass storage for data or instructions. By way of example, and not limitation, the memory 102 may include a hard disk drive (HDD), a floppy disk drive, a flash memory, an optical disk, a magnetooptical disk, a magnetic tape, or a universal serial bus (USB) drive or a combination of two or more of these. In one example, the memory 102 may include removable or non-removable (or fixed) media, or the memory 102 is non-volatile solid-state memory. The memory 102 may be internal or external to an integrated gateway redundancy device.

In one example, the memory 102 may be a read only memory (ROM). In one example, the ROM may be mask-programmed ROM, programmable ROM (PROM), erasable PROM (EPROM), electrically erasable PROM (EEPROM), electrically alterable ROM (EAROM), or a flash memory, or a combination of two or more of these.

The processor 101 reads and executes the computer program instructions stored in the memory 102 to implement a above tiled display method for servers respectively connected to display units in a tiled screen, and achieve the corresponding technical effects, which are not described herein again for brevity.

In one example, the server may also include a communication interface 103 and a bus 1010. As shown in FIG. 10, the processor 101, the memory 102, the display 103, and the communication interface 104 are connected together via the bus 1010 to complete communication among them.

Figure 11:
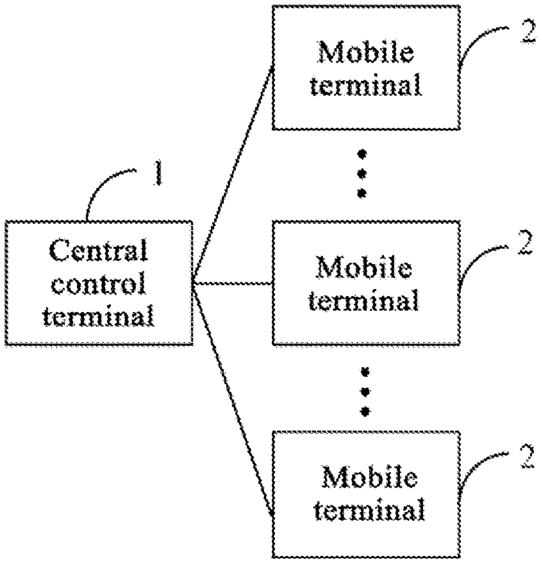
FIG. 11 is a schematic diagram of a structure of a data transmission system according to an embodiment of the present disclosure.

The embodiment of the present disclosure further provides a data transmission system, which may be a conference system. FIG. 11 is a schematic diagram of a structure of a data transmission system according to an embodiment of the present disclosure. As shown in FIG. 11, the data transmission system includes the central control terminal 1 shown in FIG. 9 and at least one mobile terminal 2 shown in FIG. 10.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and essence of the present disclosure, and such changes and modifications also fall within the scope of the present disclosure.

What is claimed is:

1. A data transmission method for a central control terminal, comprising:

reading an identification information of a mobile terminal in response to a near field communication signal from the mobile terminal; and determining whether the identification information belongs to a target identification set; and performing Bluetooth connection and data transmission with the mobile terminal in response to that the identification information belongs to the target identification set, wherein in response to that the identification information belongs to the target identification set, the data transmission method further comprises:

acquiring an authority level corresponding to the identification information; and sending an interface control instruction to the mobile terminal according to the authority level, so that the mobile terminal displays a menu interface corresponding to the authority level, wherein the menu interface is configured with at least one transmission mode identifier;

wherein the performing the data transmission with the mobile terminal comprises:

performing, in response to a mode selection instruction, the data transmission with the mobile terminal according to a data transmission mode corresponding to the mode selection instruction; wherein the mode selection instruction is an instruction generated by the mobile terminal in response to the transmission mode identifier selected by the user.

2. The data transmission method according to claim 1, wherein performing, in response to the mode selection instruction, the data transmission with the mobile terminal according to the data transmission mode corresponding to the mode selection instruction, comprises:

performing a file transmission operation in response to a first mode selection instruction sent by the mobile terminal; wherein the file transmission operation comprises:

sending a first file corresponding to a first file selection instruction to the mobile terminal in response to the first file selection instruction; and/or receiving a second file sent by the mobile terminal.

3. The data transmission method according to claim 1, wherein performing, in response to the mode selection instruction, the data transmission with the mobile terminal according to the data transmission mode corresponding to the mode selection instruction, comprises:

performing password verification with the mobile terminal in response to the first mode selection instruction sent by the mobile terminal; and performing a file transmission operation in response to the password being successfully verified; wherein the file transmission operation comprises:

sending a first file corresponding to a first file selection instruction to the mobile terminal in response to the first file selection instruction; and/or receiving a second file sent by the mobile terminal.

4. The data transmission method according to claim 1, wherein performing, in response to the mode selection instruction, the data transmission with the mobile terminal according to the data transmission mode corresponding to the mode selection instruction, comprises:

acquiring an image sent by the mobile terminal in response to a second mode selection instruction sent by the mobile terminal and controlling a display screen to display the image.

5. The data transmission method according to claim 1, wherein performing, in response to the mode selection instruction, the data transmission with the mobile terminal according to the data transmission mode corresponding to the mode selection instruction, comprises:

acquiring a category identifier of the mobile terminal in response to a third mode selection instruction sent by the mobile terminal;

determining an identity label of the mobile terminal according to the authority level and the category identifier of the mobile terminal;

selecting at least one target file from a pre-stored file set, wherein a plurality of third files are stored in the file set, each of the plurality of third files is labeled with a corresponding file label, and the target file is the third file with a labeled file label consistent with the identity label; and sending the at least one target file to the mobile terminal.

6. The data transmission method according to claim 1, wherein performing, in response to the mode selection instruction, the data transmission with the mobile terminal according to the data transmission mode corresponding to the mode selection instruction, comprises:

performing password verification with the mobile terminal in response to a third mode selection instruction sent by the mobile terminal;

acquiring a category identifier of the mobile terminal in response to the password verification being successful;

determining an identity label of the mobile terminal according to the authority level and the category identifier of the mobile terminal;

selecting at least one target file from a pre-stored file set, wherein a plurality of third files are stored in the file set, each of the plurality of third file is labeled with a corresponding file label, and the target file is the third file with a labeled file label consistent with the identity label;

sending the at least one target file to the mobile terminal.

7. The data transmission method according to claim 1, wherein performing, in response to the mode selection instruction, the data transmission with the mobile terminal according to the data transmission mode corresponding to the mode selection instruction, comprises:

recording current time and the identification information of the mobile terminal in response to a fourth mode selection instruction sent by the mobile terminal; and/or sending a prompt instruction to the mobile terminal, so that the mobile terminal displays prompt information in response to the prompt instruction, wherein the prompt information is used for prompting a user to input survey information to the mobile terminal; and receiving a survey result fed back by the mobile terminal according to the survey information.

8. A data transmission method for a mobile terminal, comprising:

sending a near field communication signal to a central control terminal, so that the central control terminal reads identification information carried in the near field communication signal, and determines whether the identification information belongs to a target identification set; and performing Bluetooth connection and data transmission with the central control terminal in response to that the identification information belongs to the target identification set, wherein in response to the identification information belongs to the target identification set, the data transmission method further comprises:

receiving an interface control instruction sent by the central control terminal; wherein the interface control instruction is generated by the central control terminal according to an authority level corresponding to the identification information; and displaying a menu interface corresponding to the authority level in response to the interface control instruction, wherein the menu interface is configured with at least one transmission mode identifier;

performing the data transmission with the central control terminal comprises:

generating a mode selection instruction in response to the transmission mode identifier selected by the user, sending the mode selection instruction to the central control terminal, and performing the data transmission with the central control terminal according to a data transmission mode corresponding to the mode selection instruction.

9. The data transmission method according to claim 8, wherein generating the mode selection instruction in response to the transmission mode identifier selected by the user, sending the mode selection instruction to the central control terminal, and performing the data transmission with the central control terminal according to the data transmission mode corresponding to the mode selection instruction, comprises:

generating a first mode selection instruction in response to a first transmission mode identifier selected by the user; and sending the first mode selection instruction to the central control terminal, so that the central control terminal perform a file transmission operation in response to the first mode selection instruction; wherein the file transmission operation comprises:

receiving a first file sent by the central control terminal; and/or sending a second file corresponding to a second file selection instruction to the central control terminal in response to the second file selection instruction.

10. The data transmission method according to claim 8, wherein generating the mode selection instruction in response to the transmission mode identifier selected by the user, sending the mode selection instruction to the central control terminal, and performing the data transmission with the central control terminal according to the data transmission mode corresponding to the mode selection instruction, comprises:

generating a first mode selection instruction in response to a first transmission mode identifier selected by the user;

sending the first mode selection instruction to the central control terminal, and performing password verification with the central control terminal; and performing a file transmission operation in response to the password verification being successful; wherein the file transmission operation comprises:

receiving a first file sent by the central control terminal; and/or sending a second file corresponding to a second file selection instruction to the central control terminal in response to the second file selection instruction.

11. The data transmission method according to claim 8, wherein generating the mode selection instruction in response to the transmission mode identifier selected by the user, sending the mode selection instruction to the central control terminal, and performing the data transmission with the central control terminal according to the data transmission mode corresponding to the mode selection instruction, comprises:

generating a second mode selection instruction in response to a second transmission mode identifier selected by the user;

sending the second mode selection instruction to the central control terminal; and acquiring an image displayed currently on a display interface, and sending the image to the central control terminal so that the central control terminal controls a display screen to display the image.

12. The data transmission method according to claim 8, wherein generating the mode selection instruction in response to the transmission mode identifier selected by the user, sending the mode selection instruction to the central control terminal, and performing the data transmission with the central control terminal according to the data transmission mode corresponding to the mode selection instruction, comprises:

generating a third mode selection instruction in response to a third transmission mode identifier selected by the user;

sending the third mode selection instruction to the central control terminal so that the central control terminal acquires a category identifier of the mobile terminal in response to the third mode selection instruction, determines an identity label of the mobile terminal according to the authority level and the category identifier, and selects at least one target file from the pre-stored file set, wherein a plurality of third files are stored in the file set, each of the plurality of third files is labeled with a corresponding file label, and the target file is the third file with a labeled file label consistent with the identity label; and receiving the at least one target file sent by the central control terminal.

13. The data transmission method according to claim 8, wherein generating the mode selection instruction in response to the transmission mode identifier selected by the user, sending the mode selection instruction to the central control terminal, and performing the data transmission with the central control terminal according to the data transmission mode corresponding to the mode selection instruction, comprises:

generating a third mode selection instruction in response to a third transmission mode identifier selected by the user;

sending the third mode selection instruction to the central control terminal, and performing password verification with the central control terminal; wherein the central control terminal acquires, in response to the third mode selection instruction, a category identifier, determines an identity label of the mobile terminal according to the authority level and the category identifier, and selects at least one target file from the pre-stored file set, wherein a plurality of third files are stored in the file set, each of the plurality of third file is labeled with a corresponding file label, and the target file is the third file with a labeled file label consistent with the identity label; and receiving the at least one target file sent by the central control terminal in response to the password verification being successful.

14. The data transmission method according to claim 8, wherein generating the mode selection instruction in response to the transmission mode identifier selected by the user, sending the mode selection instruction to the central control terminal, and performing the data transmission with the central control terminal according to the data transmission mode corresponding to the mode selection instruction, comprises:

generating a fourth mode selection instruction in response to a fourth transmission mode identifier selected by the user;

sending the fourth mode selection instruction to the central control terminal so that the central control terminal records current time and the identification information of the mobile terminal; and/or receiving a prompt instruction sent by the central control terminal, and displaying prompt information in response to the prompt instruction, wherein the prompt information is used for prompting the user to input survey information; and sending a survey result fed back according to the survey information to the central control terminal.

15. A central control terminal, comprising a memory and a processor, the memory having a computer program stored thereon, wherein the computer program when executed by the processor implements the data transmission method according to claim 1.

16. A mobile terminal, comprising a memory and a processor, the memory having a computer program stored thereon, wherein the computer program, when executed by the processor, implements the data transmission method according to claim 8.

17. A data transmission system, comprising the central control terminal according to claim 15.

* * * * *